US009185096B2

(12) United States Patent
Avni et al.

(10) Patent No.: US 9,185,096 B2
(45) Date of Patent: Nov. 10, 2015

(54) IDENTITY VERIFICATION

(75) Inventors: Yossi Avni, Caesarea (IL); Eytan Suchard, Kiryat Bialik (IL)

(73) Assignee: Applied Neural Technologies Limited (VG)

( * ) Notice: Subject to any disclaimer, the term of this patent is extended or adjusted under 35 U.S.C. 154(b) by 80 days.

(21) Appl. No.: 13/806,376

(22) PCT Filed: Jun. 23, 2011

(86) PCT No.: PCT/GB2011/051186
§ 371 (c)(1),
(2), (4) Date: Apr. 24, 2013

(87) PCT Pub. No.: WO2011/161461
PCT Pub. Date: Dec. 29, 2011

(65) Prior Publication Data
US 2013/0205380 A1      Aug. 8, 2013

(30) Foreign Application Priority Data

Jun. 23, 2010   (GB) .................................. 1010546.8

(51) Int. Cl.
*H04L 29/06*      (2006.01)
*H04W 12/06*      (2009.01)

(52) U.S. Cl.
CPC ............ *H04L 63/08* (2013.01); *H04L 63/0853* (2013.01); *H04L 63/18* (2013.01); *H04W 12/06* (2013.01)

(58) Field of Classification Search
USPC .......................................................... 726/7
See application file for complete search history.

(56) References Cited

U.S. PATENT DOCUMENTS

| 5,757,916 | A | * | 5/1998 | MacDoran et al. | 380/258 |
|---|---|---|---|---|---|
| 5,828,772 | A | * | 10/1998 | Kashi et al. | 382/119 |
| 5,838,812 | A | * | 11/1998 | Pare et al. | 382/115 |
| 6,157,731 | A | * | 12/2000 | Hu et al. | 382/119 |
| 6,163,616 | A | * | 12/2000 | Feldman | 382/115 |
| 6,381,344 | B1 | * | 4/2002 | Smithies et al. | 382/115 |
| 7,715,600 | B2 | * | 5/2010 | Avni et al. | 382/119 |

(Continued)

FOREIGN PATENT DOCUMENTS

| EP | 1802155 A1 * | 6/2007 |
|---|---|---|
| WO | 03048909 A2 | 6/2003 |

OTHER PUBLICATIONS

A digital signature scheme secure against adaptive chosen-message attacks|http://people.csail.mit.edu/silvio/Selected%20Scientific%20Papers/Digital%20Signatures/A_Digital_Signature_Scheme_Secure_Against_Adaptive_Chosen-Message_Attack.pdf|1988|Goldwasser et al.|pp. 281-308.*

(Continued)

*Primary Examiner* — Mahfuzur Rahman
(74) *Attorney, Agent, or Firm* — Lerner, David, Littenberg, Krumholz & Mentlik, LLP (57) ABSTRACT

A method of verifying the identity of a user comprising: initiating (50) a sign-in request from a first computing device to an authentication server; receiving (58) an instruction from the authentication server to provide signature data from a second computing device; entering (64) signature data at the second computing device and sending the signature data to the authentication server; verifying (65) the signature data at the authentication server; notifying (66) the user that their identity has been verified on the basis of the data received from the second computing device.

33 Claims, 5 Drawing Sheets

(56) References Cited

U.S. PATENT DOCUMENTS

| | | | |
|---|---|---|---|
| 8,074,889 B2* | 12/2011 | Beenau et al. | 235/487 |
| 8,601,256 B2* | 12/2013 | Baentsch et al. | 713/151 |
| 8,612,763 B1* | 12/2013 | Axel et al. | 713/176 |
| 2005/0226473 A1* | 10/2005 | Ramesh | 382/119 |
| 2007/0296551 A1* | 12/2007 | Beenau et al. | 340/10.1 |
| 2009/0106556 A1 | 4/2009 | Hamid | |
| 2010/0265038 A1* | 10/2010 | Beenau et al. | 340/5.83 |
| 2011/0088087 A1* | 4/2011 | Kalbratt | 726/7 |
| 2013/0251214 A1* | 9/2013 | Chung | 382/116 |

OTHER PUBLICATIONS

International Search Report dated Oct. 27, 2011 for Application No. PCT/GB2011/051186.

* cited by examiner

IDENTITY VERIFICATION

FIELD OF THE INVENTION

The present invention relates to identity verification. In particular, the present invention relates to a method and an associated system for verifying the identity of a user on a computer system.

BACKGROUND TO THE INVENTION

The use of computers (and also netbooks, notebooks and tablet like devices) within computer networks such as the Internet is constantly growing. Additionally, mobile phones ("smartphones") are becoming more powerful and are increasingly providing functionality similar to more traditional computer systems.

Security within such computer networks is important as users wish to exchange personal information such as usernames and password with trusted websites. In such a context it is becoming increasingly important to protect against computer network attacks.

One of the most prevalent network attacks used against individuals and large organizations alike are man-in-the-middle (MITM) attacks. Considered an active eavesdropping attack, MITM works by an attacking host computer device establishing connections to victims' machines and relaying messages between them. In cases like these, one victim believes it is communicating directly with another victim, when in reality the communication flows through the host computer device performing the attack. The end result is that the attacking host can not only intercept sensitive data, but can also inject and manipulate a data stream to gain further control of its victims' computer devices.

A further network security issue is provided by the practice of "phishing". In the field of computer security, phishing is the criminally fraudulent process of attempting to acquire sensitive information such as usernames, passwords and credit card details by masquerading as a trustworthy entity in an electronic communication. Communications purporting to be from popular social web sites, auction sites, online payment processors or IT administrators are commonly used to lure the unsuspecting public. Phishing is typically carried out by e-mail or instant messaging, and it often directs users to enter details at a fake website whose look and feel are almost identical to the legitimate one. Even when using server authentication, it may require tremendous skill to detect that the website is fake. Phishing is an example of social engineering techniques used to fool users, and exploits the poor usability of current web security technologies. Attempts to deal with the growing number of reported phishing incidents include legislation, user training, public awareness, and technical security measures.

It is an objection of the present invention to provide a method of identity verification that overcomes or substantially mitigates the above problems.

STATEMENTS OF INVENTION

According to a first aspect of the present invention there is provided a method of verifying the identity of a user comprising: initiating a sign-in request from a first computing device to an authentication server; receiving an instruction from the authentication server to provide signature data from a second computing device; entering signature data at the second computing device and sending the signature data to the authentication server; verifying the signature data at the authentication server; notifying the user that their identity has been verified on the basis of the data received from the second computing device.

The present invention provides a verification method in which two separate communications devices (the first and second computing devices above) are used such that the chances of a MITM attack are greatly reduced. The present invention allows a user to verify/authenticate his identity. The invention may be used to gain access to a protected resource, such as a password protected website. According to the invention a sign-in request is initiated by the user on a first computing device and sent to an authentication server. The user then receives an instruction at the first computing device from the server to provide signature data from a second computing device. The user then enters the signature data and sends it to the server where the data is verified. The server then notifies the user that their identity has been verified. As part of the verification process the user may be granted access to a protected resource.

The instruction may be received at either the first or second computing device. Conveniently, the instruction may be received at the first computing device. The user may be notified at either the first or the second computing device that their identity has been verified. Conveniently the user may be notified at the first computing device.

Preferably, the first computing device is a PC (or laptop) and the second computing device is a mobile phone device.

Conveniently the signature data comprises biometric data in order to increase the security of the verification process.

Conveniently, the sign-in request comprises a username that is sent to the authentication server. In response to receiving the username the authentication server may generate a unique transaction number in response to receiving the sign-in request.

Conveniently the second computing device comprises a unique device ID which is associated with the user. In the case of a mobile phone this ID may comprise the phone's IMEI number. Preferably the authentication server checks the unique device ID and matches it to the username associated with the generated transaction number.

The first computing device may communicate with the authentication server via a first communications channel.

The first computing device may be a computer and the first communications network may be a computer network. In such an instance the computer network may conveniently be the Internet. Preferably, the second computing device communicates with the authentication server via a second communications channel and preferably the second communications channel is different to the first communications channel. The second computing device may comprise a mobile computing device and the second communications channel may comprise a mobile telecommunications network. Conveniently, the first computing device may receive a signature information element from the authentication server to facilitate entering signature data on the second computing device and sending the signature data to the server. For example, the information element may, once transferred to the second computing device, open a signature application (e.g. a virtual sign-in pad) on the second computing device. Alternatively or additionally, the instruction element may comprise details of the server (i.e. an instruction to the second computing device as to where to send signature data) and/or details of any transaction number generated by the server in response to the initial sign-in request.

The information element may be in encoded form.

The information element may be in the form of an optical representation and the method may further comprise displaying the information element on a display device of the first computing device for capture by a camera device on the second computing device.

The optical representation may be in the form of a barcode, such as a two-dimensional barcode, a glyph or a dynamic optical encoding of content.

Alternatively, the information element may be in the form of a wireless communication signal such as a radio frequency identity tag sent via a wireless communication channel such as Bluetooth®, infrared, WiFi, Near Field Communication or any other short range standard communication media.

Conveniently the step of notifying the user may comprise sending an authentication token from the authentication server to the first computing device. The authentication token may preferably be arranged to enable the first computing device to access a protected resource, such as a username/password protected website.

In one example of the invention, the sign-in request may be generated in response to a user initiating signature of an electronic document and the step of notifying the user that their identity has been verified may comprise generating a signature image for incorporation into the electronic document.

According to a second aspect of the present invention there is provided an authentication server for verifying the identity of a user, the server comprising: input module arranged to receive a sign-in request for the user from a first communication device; processing module arranged to validate the sign-in request and to generate an instruction to the user to provide signature data from a second communication device associated with the user; output module arranged to output the signature instruction wherein, upon receipt at the input module, of signature data from the second communications device the processing module is arranged to verify the signature data and generate a verification communication verifying the identity of the user, the output module being arranged to send the verification communication.

The instruction to provide signature data may be sent to the first computing device. The verification communication may be sent to the first computing device.

Conveniently, the generated instruction to the user to provide signature data from a second communication device may comprise a signature information element such as a barcode that is presented on the screen of the first computing device and that is scanned by a camera of the second input device. Alternatively, the barcode may be sent from the first computing device to the second computing device via Bluetooth, infrared signal, Wi-Fi, or any other short range standard communication media.

Conveniently, the sign-in request may comprise a username and the processing module may be arranged to validate the sign-in request by validating the username.

Preferably the processing module may be arranged to verify/validate signature data received from the second communications device against stored signature data associated with the user.

Conveniently the verification communication may be arranged to enable the first computing device to access a protected resource such as a password protected website.

According to a third aspect of the present invention there is provided a method of operating an authentication server for verifying the identity of a user, comprising: receiving a sign-in request for the user from a first communication device; validating the sign-in request and generating an instruction to the user to provide signature data from a second communication device associated with the user; outputting the signature instruction wherein, upon receiving signature data from the second communications device, validating the signature data, generating a verification communication validating the identity of the user and sending the verification communication.

According to a fourth aspect of the present invention there is provided a method of verifying the identity of a user comprising: initiating a sign-in request from a first computing device to an authentication server; receiving an instruction from the authentication server to provide signature data; entering signature data and sending to the authentication server; verifying the signature data at the authentication server; notifying the user that their identity has been verified on the basis of the received signature data.

The invention extends to a carrier medium for carrying a computer readable code for controlling a server to carry out the method of any one of the first, third and fourth aspects of the present invention.

It is noted that the second, third and fourth aspects of the present invention may comprise preferred features of the first aspect of the present invention.

BRIEF DESCRIPTION OF THE DRAWINGS

Embodiments of the present invention will now be described, by way of example only, with reference to the accompanying drawings, in which like reference numerals are used for like parts, and in which.

DETAILED DESCRIPTION OF THE INVENTION

In the following description like numerals are used to reference like features within the Figures. The terms "verifying" and "validating" are regarded as interchangeable. Similarly, "validation", "authentication" and "verification" are regarded as interchangeable.

Figure 1:
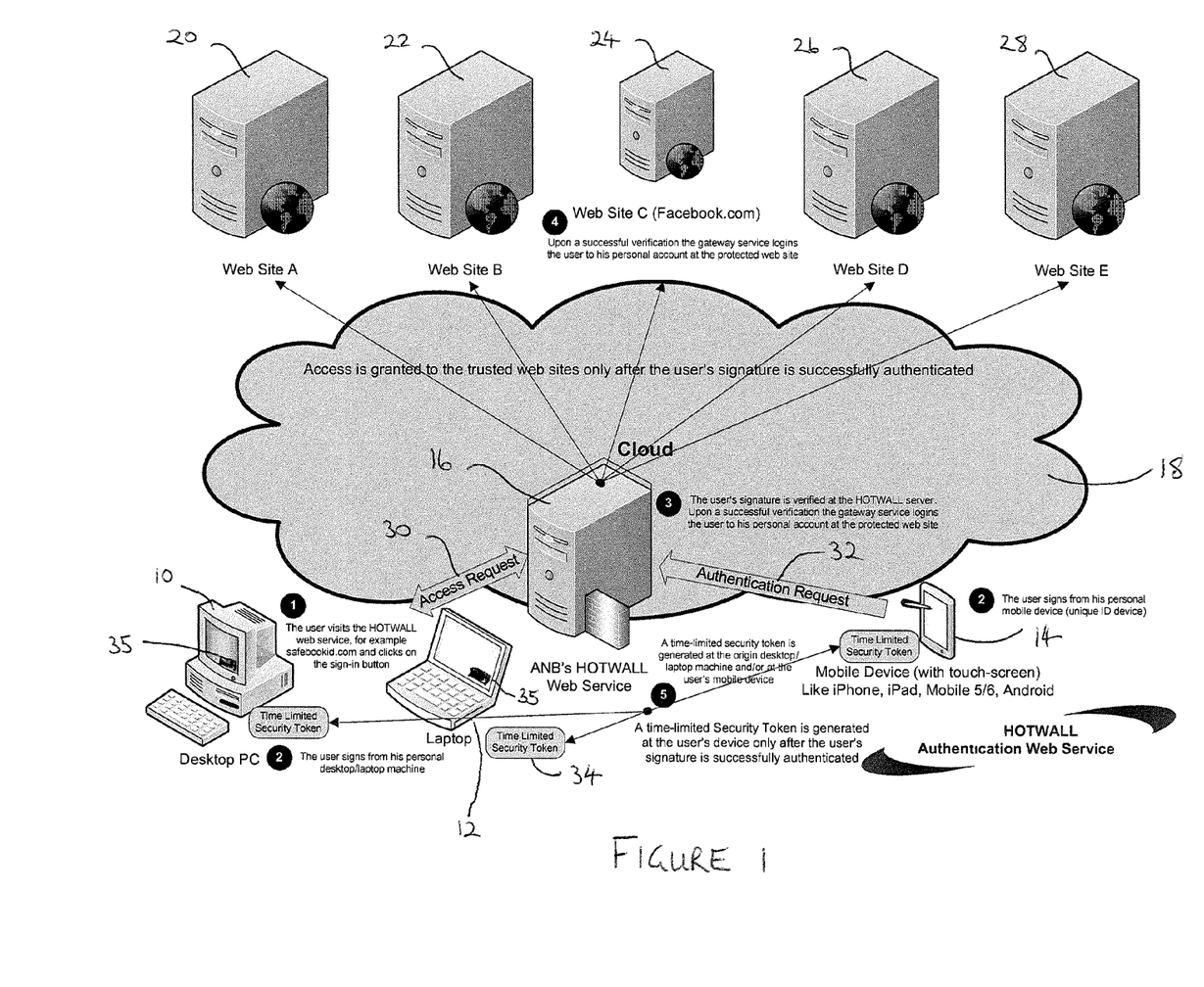
FIG. 1 shows a network environment in which a user wishes to access third party computer system.

FIG. 1 describes the operation of the present invention in the context of an example using a protected website (e.g Facebook®) which supports the Open ID standard (http://openid.net/). In the example of FIG. 1 an authentication gateway (which is referred to herein as the "Hotwall" gateway or "Hotwall" server) in accordance with an embodiment of the present invention is used to manage and handle the user's request to log in to their user account of a remote web server.

FIG. 1 shows a desktop PC 10, a laptop 12 and a portable mobile computing device 14 (e.g. a smartphone such as an iPhone® or Android® mobile phone, or an Internet enabled portable computer such as a tablet PC, an iPad, a notebook or netbook). It is noted however that the verification/authentication system of the present invention may operate with any computing device that is capable of accessing a computer network (such as the Internet) for the purpose of connecting to a remote website/computer/server.

Each of the PC 10, laptop 12 and mobile computing device 14, collectively referred to herein as "user devices", are in communication (via a computer network) with an authentication server 16, herein referred to as the Hotwall server. It is noted that the user devices may be in communication with the Hotwall server 18 via a local computer network, e.g. a Wi-Fi, Bluetooth or other network, or may be located remotely from the server such that they are in communication with the Hotwall server via a computer network (such as the Internet 18) or a telecommunications network (such as a mobile phone network) or a combination thereof.

The Hotwall server is, in turn, in communication with a plurality of remote websites (20, 22, 24, 26, 28), including in the current example the website Facebook.com 24. The Hotwall server is in communication with such remote servers/ websites via, for example, the Internet 16 (referred to as "the cloud" in FIG. 1).

Two different options for interacting with the Hotwall server are presented below. In a first option a user interacts with the server via a desktop 10 or laptop 12 computer only. In an alternative, and preferred solution however the user utilises two separate devices to interact with the server in order to verify their identity, a desktop/laptop (10/12) and a separate mobile computing device 14 (e.g. a mobile telephone). In this latter, preferred, option two parallel communication channels 30, 32 (both secured by VPN SSL v3—encrypted), one from the desktop PC and the second from the mobile device, may be used. It is noted that the two different communication channels may be carried on different communications networks, e.g. in the example of FIG. 1 the first channel may be via a computer network and the second channel via a mobile telecommunications network.

It is noted however, that the choice of interaction options would be determined based on a pre-defined security policy (in other words, a user may decide in advance during a security set up process, if he is going to sign from both devices or only from the desktop device).

With reference to FIG. 1, the two interaction options discussed above are described in relation to a user opening his Internet browser and accessing the Hotwall™ gateway which is the secured gateway to his personal account on Facebook.com.

Option (i) User Authentication from Desktop/Laptop Machine

Under this option, the user visits a website associated with the Hotwall server, the "Hotwall website" and clicks on a Sign-In button 35. In this particular example the user has configured his personal security policy to require him to sign in using his desktop/laptop machine only. A virtual signature pad 36 (shown in FIG. 1*a*) is then opened on the desktop to enable the user to enter his signature using the computer's mouse or other input device associated with the computer.

Figure 1A:
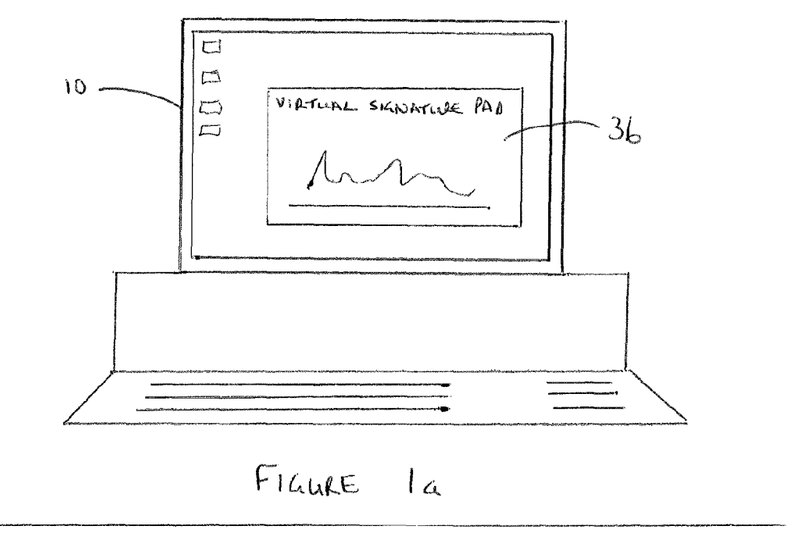
FIG. 1a shows a desktop PC operating in accordance with a user verification/authentication process in accordance with embodiments of the present invention.

After the user signs at the virtual signature pad 36, his signature is sent for verification at the Hotwall™ server 16 (authentication/gateway web service). Upon signature verification (successful sign-in) the gateway web service logs the user into his account at Facebook.com using the Open ID standard. The user's account is displayed on his desktop/ laptop machine 10/12. A time-limited security token 34 is generated for the accessed desktop/laptop machine.

Option (ii) User Authentication from Mobile Device (for Example, iPhone, iPad)

Figure 1B:
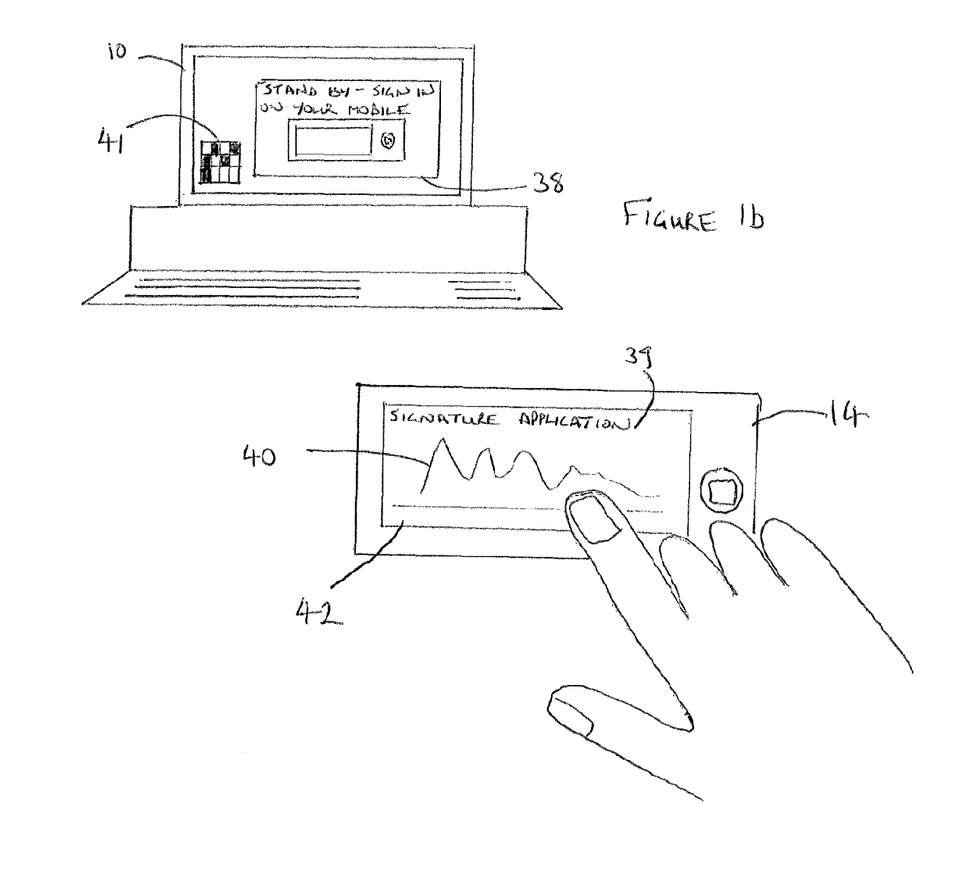
FIG. 1b shows a desktop PC and mobile computing device operating in accordance with a further user verification/authentication process in accordance with embodiments of the present invention.

In this option the user again visits the website associated with the Hotwall server 16, the "Hotwall website" and clicks on a Sign-In button 35 (on a first computing device 10/12). In this case the personal security policy is configured to require the user to provide their authentication signature via their personal mobile computing device (e.g. the user's iPhone, iPad or equivalent device). At this point the sign-in web page 38 on the Hotwall™ website changes to a standby mode (FIG. 1*b*) and waits for the user to sign-in from his mobile computing device 14 (which has a unique user ID). As noted above, a signature information element 41 may be sent by the server 16 to the PC/laptop 10/12 to facilitate the provision of signature data from the second computing device 14 to the server 16.

At this point the user may start a verification/signature application (FIG. 1*b*) on his mobile device, e.g. the Applicant's "BioSign" invention as defined in co-pending European patent application 02782378.3. The verification/signature application 39 may be configured to receive the applicant's signature 40 (e.g. passcode entry, pattern lock (i.e. swiping a pre-defined pattern) or a biometric based signature) and then send the signature 40 for verification at the Hotwall server 16. Upon valid signature verification (successful sign-in) the gateway web service logs the user in to his account in Facebook.com 24 (see FIG. 1). The user's account is displayed on his desktop/laptop machine and a time-limited security token 34 is generated at the accessed desktop/laptop machine. In the case of the Applicant's BioSign application a virtual signature-pad 42 may be opened on the mobile device as part of this process for the user to sign his signature (identity) using his fingertip.

The process of authenticating a user in accordance with an embodiment of the present invention is described in detail below in conjunction with FIG. 2.

a. In Step 50, the user accesses the Hotwall gateway 16 (web site) and clicks on the requested Sign-In button 35 (or on the default web site Sign-In) in order to initiate a sign-in request from a first communications device (e.g. the desktop 10 or laptop 12);

b. In Step 52, a VPN (virtual private network SSL v3 communication channel) secured connection 30 is established between the user desktop machine 10 (or laptop 12) and the Hotwall gateway 16 in order to avoid any MITM (Man-In-The-Middle) attacks. The VPN is installed on-the-fly at the user's opened Internet browser (Desktop PC).

c. In Step 54, the Hotwall client application (which was installed on-the-fly at the user's desktop) requests the user's universal username (Hotwall's unique username). In response to the request, the user enters his unique username.

d. In Step 56, the Hotwall service validates the received username. If the user has an enabled account then the Hotwall gateway generates a unique transaction number—and optionally a barcode to be read by the second computing device—and waits for authentication (via the mobile device transaction described below). The unique transaction number comprises a Global Unique Identifier (GUID), a unique key of 32 letters or numbers. In the event that there is already a pending transaction on the Hotwall gateway when the user logs in, i.e. a waiting transaction generated from a different source (Desktop PC—machine or a different Internet browser—session), the user's account is locked for a pre-defined time (5 minutes). This process ensures that there is only one transaction waiting for each user to avoid any credential theft/abuse.

It is noted that the unique GUID is used for encrypting the signature data and its hash in order to avoid any re-play attack. This procedure (super encryption) is added to the basic encrypted communication which is establish using the VPN SSL v.3 channel (VPN on-the-fly). This ensures that every transaction is unique.

e. In Step 58, a message is displayed at the user's desktop PC 10—indicating the next step that should be taken (e.g. a request to sign in via the user's registered mobile computing device 14 or a security alert message: indicating that duplicated transactions were recognized and that the user should retry again within 5 minutes).

f. In Step 60, the user opens an application 39 on his mobile device 14. It is noted that the device will have previously been registered with the Hotwall gateway. Once opened, the application sends the mobile device ID ("device ID") to the gateway server. It is noted that mobile device numbers (IDs) are unique identifiers (e.g. Apple phones comprise a 40 digit alphanumeric code) that can be used to identify the phone and therefore the user to the gateway server. In one variant of the present invention the authentication server may generate a barcode 41 that is sent to the first computing device 10/12. This barcode may be scanned or otherwise read by the second computing device 14 in order to initiate the communication between the mobile device 14 and the server 16.

g. In Step 62, the gateway 16 validates the mobile device ID and informs the mobile device 14 of any pending transactions. The GUID is also supplied to the mobile device at this stage. In case there is only one transaction waiting, the user is asked to sign on his mobile touch-screen using his fingertip 40. In case, there is more than one waiting transaction, the request is reset asking for the user to re-generate a unique transaction. This procedure avoids any credential theft/abuse. In case, there is no waiting transaction at the Hotwall gateway, the user can sign for practice.

h. In the case of a single pending transaction, in Step 64, the user enters his signature 40 into the mobile device 14 (the second communications device). The user's signature is sampled in real-time on his mobile phone and sent for verification at the Hotwall gateway service 16 indicating the unique waiting transaction number. The signature data is encrypted with the GUID.

i. In Step 65, the gateway server 16 verifies the received signature information against previously stored signature data (such data may be entered, for example, during a sign in process).

j. In Step 66, in the case of a successful authentication the user is notified at his mobile device 14.

k. In Step 68, upon a successful signature verification (authentication), the waiting session at the user's Desktop PC is redirected to the default/requested web site. In order to allow access to the requested website 24 the gateway supplies a cookie 34 (security token) to the PC 10 that contains information that will allow the website to be accessed. The Hotwall cookie at the user's Internet browser is then initiated with the authorized credentials in order to enable Single-Sign-In feature, enabling the user to login to other supported web sites without the need to re-sign from his mobile device. The security token 34 is valid for a pre-defined time based on the web site security policy.

l. In Step 70, the target web site 24 (e.g. Facebook.com) identifies the user based on the pre-installed cookie 34 and then checks with the Hotwall gateway service 16 that the user has successfully authenticated and is authorized to login (valid security token). Upon a positive request, the targeted web site cookie is updated with the right access credentials. This mechanism may be established using the OPEN-ID authentication mechanism. Hotwall supports the OPEN-ID authentication protocol.

m. In Step 72, the user gains access to his personal account at the target web site 24 (for example: Facebook.com) or to the protected web pages in the targeted web site.

General Security Policy Guidelines

In general, a security policy may be configured based on the needs of the individual or of an organisation within which the individual user is operating. The following general rules are the basic security rules that are required for protecting against identity theft.

a) Unique Authentication Requests

Upon clicking on the sign-in button (35 in FIG. 1) at the Gateway authentication service Hotwall™, a unique authentication request is generated at the server Hotwall™ waiting for the user to sign and to be successfully authenticated. Optionally, a barcode 41 (or other signature information element as described above) may be presented on the screen to be scanned by a camera of the second computing device or may be sent to the second computing device from the first computing device via Bluetooth, infrared signal, Wi-Fi, or any other short range standard communication media.

b) Unique Authentication Verifications Per User

Whenever there is more than one user that generated authentication requests that are related to the same username these authentication requests (transactions) that are waiting (standby mode) to be verified at the Hotwall™ authentication web service may be cancelled in order to avoid the issue of authorization theft. After the server detects such conflict it may kill all waiting transactions that are associated to the same username while notifying the user by e-mail message to re-sign-in (re-click and generate a new unique transaction that is associated once to his username). This procedure eliminates the possibility of verifying two authentication transactions for two possibly different users that generated two authentication requests from different desktop (almost at the same time, few minutes' difference).

Behavioural Profiling for Each User's Authentication Activities

The Hotwall server 16 may be arranged to learn the behavioural profile of a registered user. In this way it may identify the origin of an authentication request. Upon receiving an authentication request from a new origin, for example, a new desktop/laptop machine 10/12 or a new mobile device 14, the security policy may take additional precautions to validate the user. For example, by asking for more personal information or by asking the user to approve the new origin of authentication request using his e-mail.

FIG. 1 maps the process workflow of authenticating users via the Hotwall™ authentication web service.

Electronic Contract Signature

Many organizations are now moving to a paperless or "paper-light" environment. Such working environments can often complicate the process of contract signature. This may involve, for example, the generation of electronic documents (PDF format) that are signed electronically using a user's personal PKI key.

Figure 3:
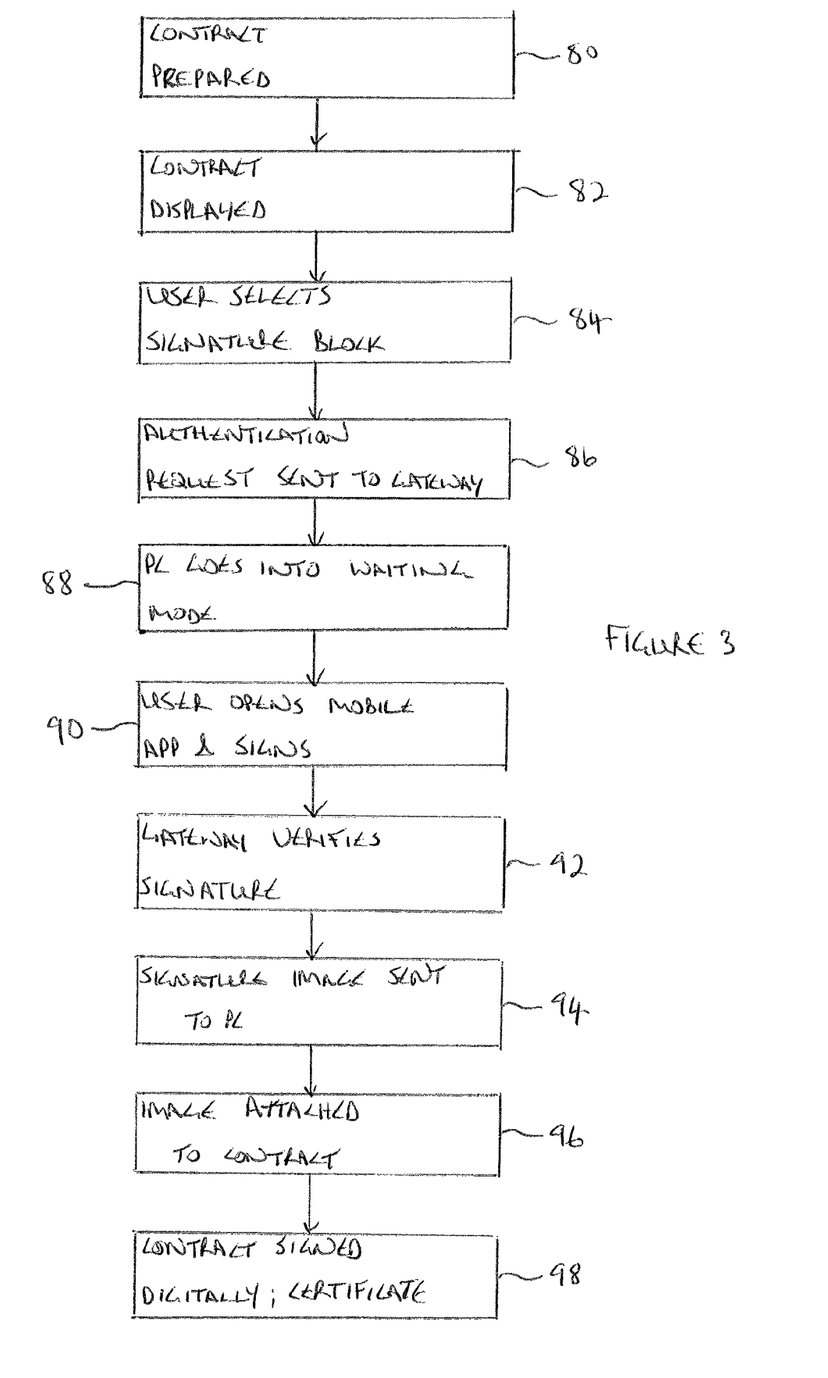
FIG. 3 is a flow chart showing a verification process in accordance with a further embodiment of the present invention.

The present invention may provide a convenient solution to the signature of documents in such paperless (or paper-light) environments as described below with reference to FIG. 3:

1. In Step 80, a customer comes to a law office in order to sign a contract;
2. In Step 82, an attorney displays the contract on a monitor (10/12) to the user;
3. In Step 84, the customer points and clicks on the signature placement section of the electronic document;
4. In Step 86, an authentication transaction request is generated and sent to the Hotwall gateway server 16.
5. In Step 88, once the transaction request is sent, the document viewer/editor goes to "Waiting mode" pending authorization from the Hotwall server 16. It is noted that this step corresponds to the first asynchronous transaction 30 required by the present invention. Optionally, a barcode 41 may be presented on the screen to be scanned by the second computing device camera or alternatively may be sent to the second computing device via Bluetooth, infrared signal, Wi-Fi, or any other short range standard communication media;
6. In Step 90, the customer opens the client application 39 on his mobile device 14 and signs 40 on the device's touchscreen;
7. In Step 92, the signature 40 is sent for verification at the Hotwall service 16 (the second asynchronous transaction 32);
8. In Step 94, upon a successful verification, the signature image is generated and sent to the waiting session on the PC 10/12 where the document is opened;
9. In Step 96, the signature is attached at the right location (signature placement);
10. In Step 98, the document is signed digitally and a certificate is generated in order to ensure the authenticity of the signed document.

ADVANTAGES OF THE INVENTION

The present invention eliminates both Man in the middle (MITM) and Phishing attacks for the following reasons.

Traditional SSL communications may be hacked because they cannot be protected from MITM attacks. In such an attack, the MITM would listen to the first encryption key negotiation between entities A and B. With entity A he would encrypt data as required by key A and with entity B he would use a different key, key B. Alternatively, the MITM could use unencrypted communication because plain-text communication doesn't trigger any alert. This way the MITM is able to talk with entity A (using A language) and with entity (using B language). Any information exchange between the A and B entities is therefore exposed and eavesdropped.

Figure 2:
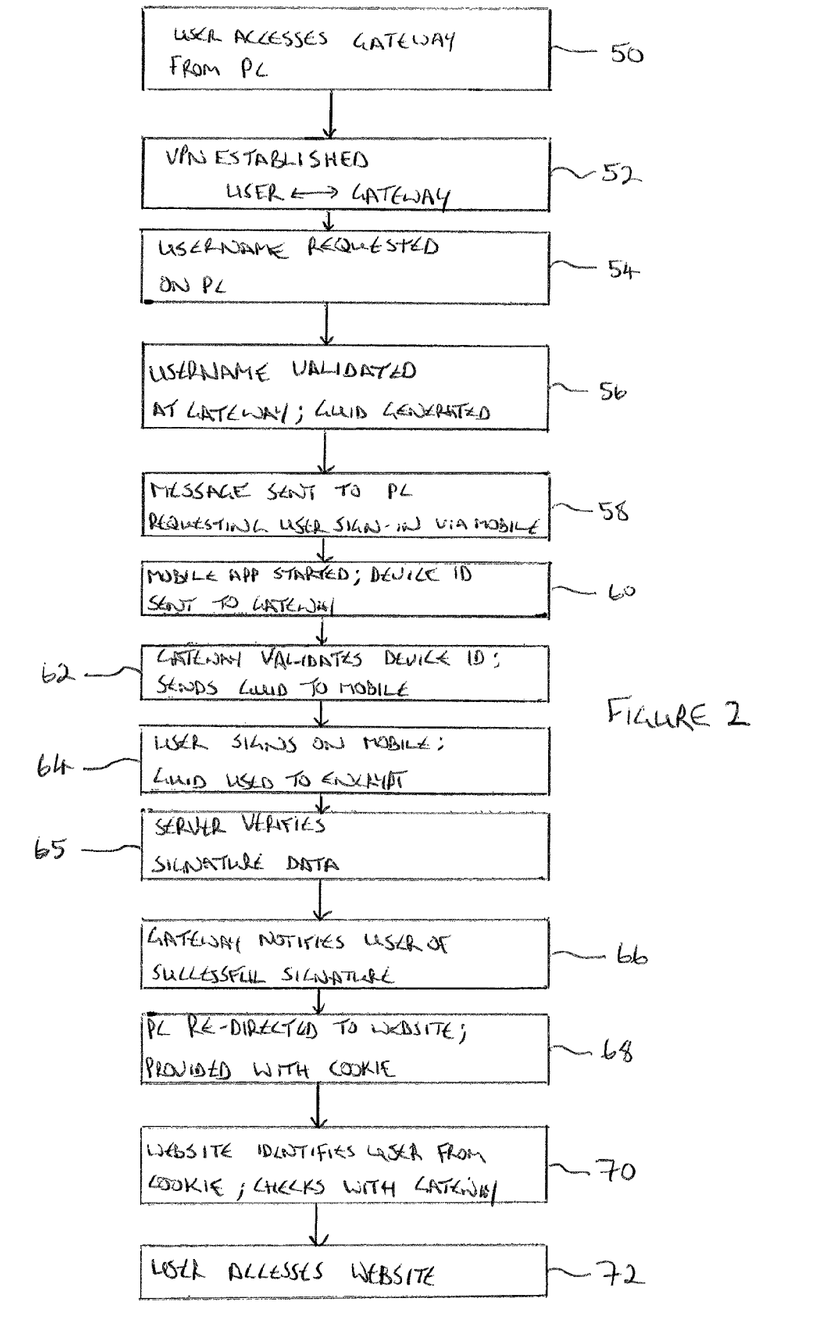
FIG. 2 is a flow chart showing a log in and verification process in accordance with an embodiment of the present invention.

In the present invention, by contrast, the request for authentication from the user desktop PC 10 (or laptop 12) to the Hotwall gateway service 16 is delivered via a VPN SSL v3 communication channel 30 which is installed (on the fly) following a user request (e.g. when the user clicks on Sign-In 35 (as shown in FIG. 1) in Step 50 of FIG. 2 above). The communication happens from the right end-points only after the user clicks in real-time. The MITM hacker can only listen to encrypted information. (The typical MITM attack is when the MITM attacker is a proxy between the end-points (active proxy) and the hacker translates the communication using two different keys (ChainCertificate attack) or by sending a plain-text communication to the user while he is in communication with the right certificate with the eBank service (SSLstrip attack).)

Secondly, the authentication process in accordance with the present invention may be used in conjunction with a user signature system that does not rely on the inputting of a textual username and password. The BioSign invention identified above incorporates biometric information relating to the user and such a process in conjunction with the present invention can help to reduce identity theft.

It is noted that in the embodiment of FIG. 2, the user signature information (be it biometric based or otherwise) is sent to the authentication server 16 (the Hotwall server) by a different communication channel 32 (mobile device to gateway in FIG. 1) to the sign-in request (computing device to gateway). The second communications channel cannot be synched by an MITM attacker. Furthermore, it is noted that when the mobile device to gateway uses a GPRS cellular data communication channel it is harder to be cracked because cellular communication usually uses more packets of communication than computer networks in order to be robust against communication interferences. In addition, eavesdropping equipment for cellular communication is much more expensive than eavesdropping equipment that is used for ordinary communications networks. In general, the effort that is invested in cellular eavesdropping is much greater than the effort invested in ordinary network eavesdropping.

Figure 4:
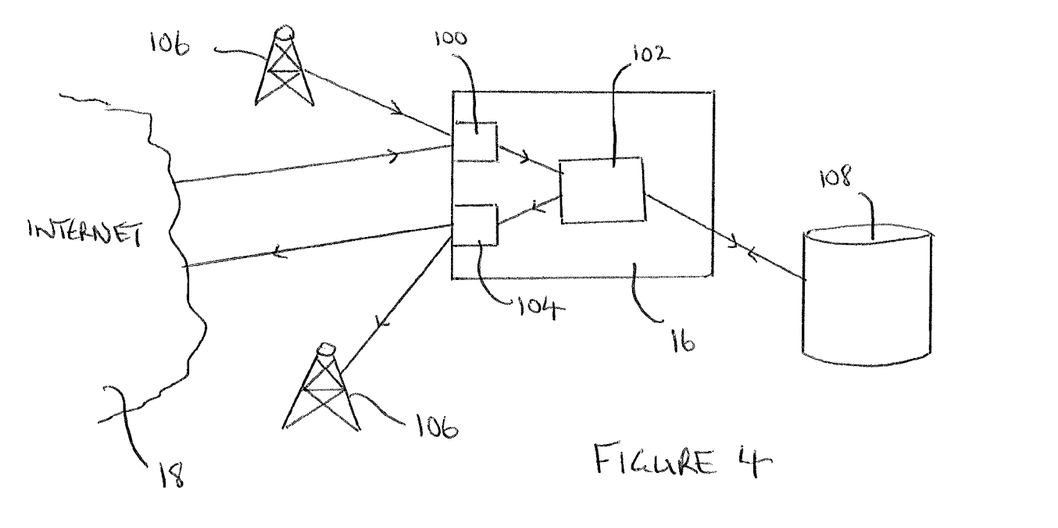
FIG. 4 shows an authentication server in accordance with embodiments of the present invention.

FIG. 4 shows an authentication server that may be used in accordance with embodiments of the present invention. The server 16 comprises an input module 100 to receive communications from a network (e.g. the Internet 18), a processing module 102 and an output module 104 (which may output communications via the Internet or other network, e.g. a mobile network 106). The server may additionally be in communication with a data store 108 which stores user details, e.g. mobile computing device IDs, user signature data etc.

Figure 5:
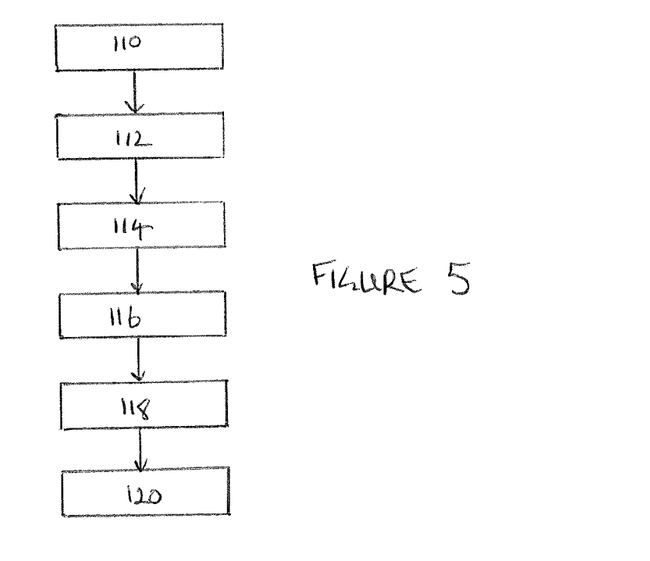
FIG. 5 shows a method of operating the authentication server of FIG. 4.

FIG. 5 shows a method of operating the server shown in FIG. 4 in accordance with embodiments of the present invention. In Step 110, the server 16 may receive a sign in request at the input module 100 from the user of a first communications device (10/12).

In Step 112, the sign in request may be validated and an instruction generated by the processing module 102, the instruction requesting the user to provide signature data from a second communications device 14. Optionally a barcode 41 (or other signature information element as described above) may be presented on the first computing device screen to be scanned by a camera of the second computing device (alternatively the barcode may be transmitted from the first computing device to the second computing device by Wi-Fi, Bluetooth or by any other short range communication media).

In Step 114, the instruction is output via the output module 104 to the second communications device 14. In Step 116 signature data is received at the input module 100 from the second communication device 14. In Step 118 the identity of the user is verified by the processing module 102 using the signature data and in Step 120 a validation communication is sent to the first communications device 10/12 from the output module 104.

It is noted that the detailed description above is directed towards an embodiment of the present invention that authenticates a user using a combination of a desktop/laptop (PC) and a mobile device. In an alternative embodiment however the signature data may be supplied from the desktop/laptop as well instead of using the mobile device.

Further variations and modifications not explicitly described above may also be contemplated without departing from the scope of the invention as defined in the appended claims.

The invention claimed is:
1. A method of verifying an identity of a user comprising:
    initiating a sign-in request from a first computing device to an authentication server, wherein the sign-in request is generated in response to the user initiating signature of an electronic document;

receiving a request from the authentication server, in the event that the first computing device is not known by the authentication server, to provide additional user information;

verifying the additional user information at the authentication server;

receiving an instruction from the authentication server to provide signature data from a second computing device;

entering signature data at the second computing device, sampling the signature data and sending the sampled signature data to the authentication server;

verifying the signature data at the authentication server; and notifying the user that their identity has been verified on the basis of the data received from the second computing device, wherein notifying the user that their identity has been verified comprises generating a signature image for incorporation into the electronic document.

2. A method as claimed in claim 1, wherein the first computing device is a PC or laptop and the second computing device is a mobile phone device.

3. A method as claimed in claim 1, wherein the signature data comprises biometric data.

4. A method as claimed in claim 1, wherein the sign-in request comprises a username that is sent to the authentication server.

5. A method as claimed in claim 4, wherein the authentication server generates a unique transaction number in response to receiving the sign-in request.

6. A method as claimed in claim 5, wherein the second computing device comprises a unique device ID which is associated with the user.

7. A method as claimed in claim 6, wherein the authentication server checks the unique device ID and matches it to the username associated with the generated transaction number.

8. A method as claimed in claim 1 wherein the first computing device communicates with the authentication server via a first communications channel.

9. A method as claimed in claim 8 wherein the first computing device is a computer and the first communications network is a computer network.

10. A method as claimed in claim 9 wherein the computer network is the Internet.

11. A method as claimed in claim 8, wherein the second computing device communicates with the authentication server via a second communications channel.

12. A method as claimed in claim 11, wherein the second communications channel is different to the first communications channel.

13. A method as claimed in claim 11, wherein the second computing device comprises a mobile computing device and the second communications channel comprises a mobile telecommunications network.

14. A method as claimed in claim 1, wherein receiving an instruction to provide signature data comprises receiving a signature information element at the first computing device, the signature information element being arranged to facilitate entering signature data at the second computing device and sending the sampled signature data to the authentication server.

15. A method as claimed in claim 14, wherein the information element comprises an optical representation and the method further comprises displaying the information element on a display device of the first computing device.

16. A method as claimed in claim 14, wherein the information element comprises at least one of a two-dimensional barcode, a glyph and a dynamic optical encoding of content.

17. A method as claimed in claim 15, wherein the second computing device comprises a camera and the method further comprises using the camera to capture the information element on the second computing.

18. A method as claimed in claim 14, wherein the information element comprises a wireless communication signal.

19. A method as claimed in claim 18, further comprising sending the wireless communication signal from the first computing device to the second computing device via Bluetooth® or WiFi.

20. A method as claimed in claim 1, wherein notifying the user comprises sending an authentication token from the authentication server to the first computing device.

21. A method as claimed in claim 20 wherein the authentication token is arranged to enable the first computing device to access a protected resource.

22. A method as claimed in claim 4, wherein in the event that there is a pending transaction already associated with the username, the authentication server locks the user account for a pre-defined time.

23. An authentication server for verifying an identity of a user, the server comprising:

an input arranged to receive a sign-in request for the user from a first communication device, wherein the sign-in request is generated in response to the user initiating signature of an electronic document;

a computer processor arranged to validate the sign-in request and to generate a signature instruction to the user to provide signature data from a second communication device associated with the user, the signature data being sampled; and an output arranged to output the signature instruction wherein, in the event that the first communication device is not known by the authentication server, the server is arranged to send a request to the user to provide additional user information and to subsequently verify the additional user information, and wherein upon receipt at the input of the sampled signature data from the second communications device, the computer processor is arranged to verify the signature data and generate a verification communication verifying the identity of the user, the output being arranged to send the verification communication, and notify the user that their identity has been verified by generating a signature image for incorporation into the electronic document.

24. A server as claimed in claim 23, wherein the sign-in request comprises a username and the computer processor is arranged to validate the sign-in request by validating the username.

25. A server as claimed in claim 23, wherein the computer processor is arranged to validate signature data received from the second communications device against stored signature data associated with the user.

26. A server as claimed in any one of claim 23, wherein the validation communication is arranged to enable the first computing device to access a protected resource.

27. A server as claimed in claim 23, wherein the protected resource comprises a password protected website.

28. A server as claimed in claim 23, wherein in the event that there is a pending transaction already associated with the username, the authentication server is arranged to lock the user account for a pre-defined time.

29. A method of operating an authentication server for verifying an identity of a user, comprising:

receiving a sign-in request for the user from a first communication device, wherein the sign-in request is generated in response to the user initiating signature of an electronic document;

in the event that the first communication device is not known, requesting additional user information and validating the additional user information;

validating the sign-in request and generating an instruction to the user to provide signature data sampled from a second communication device associated with the user outputting the instruction wherein, upon receiving signature data from the second communications device, validating the signature data, generating a verification communication verifying the identity of the user, sending the verification communication, and notifying the user that their identity has been verified by generating a signature image for incorporation into the electronic document.

30. A method of verifying an identity of a user comprising:

initiating a sign-in request from a first computing device to an authentication server, wherein the sign-in request is generated in response to the user initiating signature of an electronic document;

receiving a request to provide additional user information in the event the first computing device is not known by the authentication server;

entering the additional user information and sending to the authentication server;

verifying the additional user information at the authentication server;

receiving an instruction from the authentication server to provide signature data sampled;

entering signature data and sending to the authentication server;

verifying the signature data at the authentication server;

notifying the user that their identity has been verified on the basis of the received signature data, wherein notifying the user that their identity has been verified comprises generating a signature image for incorporation into the electronic document.

31. A non-transitory carrier medium for carrying a computer readable code for controlling a server to carry out the method of verifying an identity of a user comprising:

initiating a sign-in request from a first computing device to an authentication server, wherein the sign-in request is generated in response to the user initiating signature of an electronic document;

receiving a request from the authentication server, in the event that the first computing device is not known by the authentication server, to provide additional user information;

verifying the additional user information at the authentication server;

receiving an instruction from the authentication server to provide signature data from a second computing device;

entering signature data at the second computing device, sampling the signature data and sending the sampled signature data to the authentication server;

verifying the signature data at the authentication server; and notifying the user that their identity has been verified on the basis of the data received from the second computing device, wherein notifying the user that their identity has been verified comprises generating a signature image for incorporation into the electronic document.

32. A non-transitory carrier medium for carrying a computer readable code for controlling a server to carry out the method of operating an authentication server for verifying an identity of a user, comprising:

receiving a sign-in request for the user from a first communication device, wherein the sign-in request is generated in response to the user initiating signature of an electronic document;

in the event that the first communication device is not known, requesting additional user information and validating the additional user information;

validating the sign-in request and generating an instruction to the user to provide signature data sampled from a second communication device associated with the user outputting the instruction wherein, upon receiving signature data from the second communications device, validating the signature data, generating a verification communication verifying the identity of the user, sending the verification communication, and notifying the user that their identity has been verified by generating a signature image for incorporation into the electronic document.

33. A non-transitory carrier medium for carrying a computer readable code for controlling a server to carry out the method of verifying an identity of a user comprising:

initiating a sign-in request from a first computing device to an authentication server, wherein the sign-in request is generated in response to the user initiating signature of an electronic document;

receiving a request to provide additional user information in the event the first computing device is not known by the authentication server;

entering the additional user information and sending to the authentication server;

verifying the additional user information at the authentication server;

receiving an instruction from the authentication server to provide signature data sampled;

entering signature data and sending to the authentication server;

verifying the signature data at the authentication server;

notifying the user that their identity has been verified on the basis of the received signature data, wherein notifying the user that their identity has been verified comprises generating a signature image for incorporation into the electronic document.

* * * * *